R. L. WEBB.
SAW SET.
APPLICATION FILED MAR. 1, 1920.
1,386,821.
Patented Aug. 9, 1921.
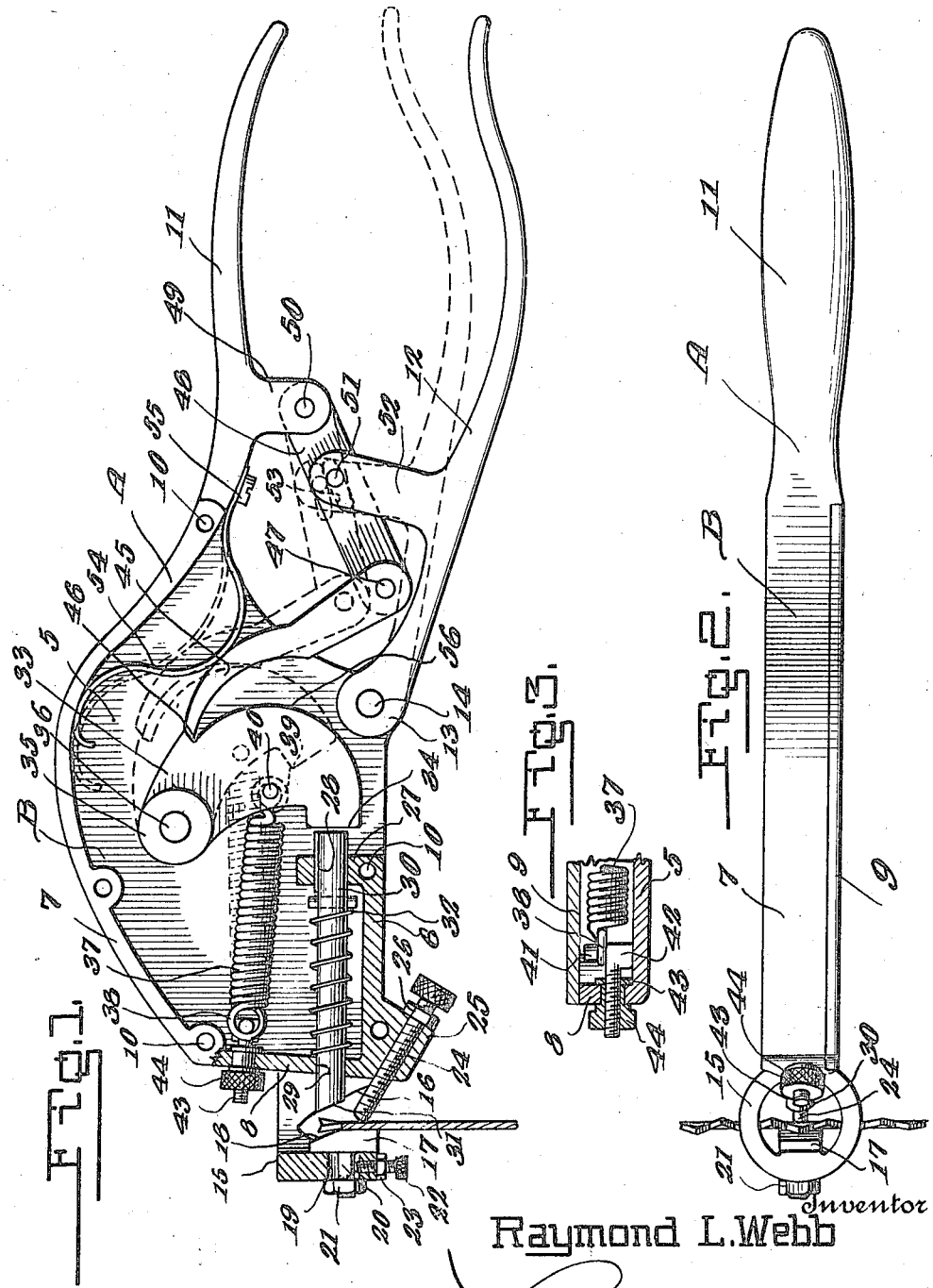
Raymond L. Webb, Inventor
By Lancaster and Allwine, Attorneys

UNITED STATES PATENT OFFICE.

RAYMOND L. WEBB, OF ATCHISON, KANSAS.

SAW-SET.

1,386,821.  Specification of Letters Patent.  Patented Aug. 9, 1921.

Application filed March 1, 1920. Serial No. 362,232.

*To all whom it may concern:*

Be it known that I, RAYMOND L. WEBB, a citizen of the United States, residing at Atchison, in the county of Atchison and State of Kansas, have invented certain new and useful Improvements in Saw-Sets, of which the following is a specification.

This invention relates to saw sets, and the primary object of the invention is to provide an improved means for setting saws which is so constructed as to deliver a blow of uniform force to the teeth of the saw, thereby preventing the teeth from being broken by an extra hard blow and insuring the setting of the teeth at the correct angle.

Another object of the invention is to provide an improved tool which is so constructed as to permit the quick and ready setting of saw teeth by inexperienced persons and entirely eliminate the labor and trouble associated therewith.

A further object of the invention is to provide an improved saw set embodying an adjustable anvil and a sliding plunger, the sliding plunger being adapted to be forced into engagement with the teeth of a saw by a handle operated spring pressed hammer.

A further object of the invention is to provide an improved means for adjusting the tension of the spring used to urge the hammer into engagement with the plunger so that the force with which the plunger hits the saw teeth can be readily regulated.

A still further object of the invention is to provide an improved saw set of the above character which is durable and efficient in use, one that is simple and easy to manufacture, and one which can be placed upon the market at a reasonable cost.

Other objects and advantages will appear in the following detailed description, taken in connection with the drawings, forming a part of this specification, in which drawings:

Figure 1 is a side elevation of the improved saw set with the cover plate removed, parts of the set being shown in section.

Fig. 2 is a top plan view of the tool.

Fig. 3 is a detail fragmentary longitudinally section through the saw set showing the means for adjusting the main frame.

Referring to the drawings in detail, wherein similar reference characters designate corresponding parts throughout the several views, the latter A indicates the improved saw set, which includes the frame B for housing the operating mechanism.

The casing B includes the outer flat guide wall 5, and the bottom, top and front walls 6, 7, and 8 which are formed integral with the outer side wall 5. A removable side wall 9 is provided, which is of the same shape as the outer side wall 5 and the same is held in place by suitable fastening elements which are inserted in openings 10 formed in the lower, top and front walls 6, 7 and 8 for that purpose. The upper rear portion of the side wall 5 and the upper wall 7 has formed integrally therewith the rearwardly extending rigid handle 11 which lies directly above the movable handle 12, the inner end of which has integrally formed therewith the hub 13 which is rotatably mounted on the pivot pin 14 carried by the side wall 5. The front wall adjacent its lower end carries the annular saw guide 15 the lower edge of which is provided at diametrically opposite points with inwardly extending V-shaped openings 16 in which the saw to be set is adapted to be positioned. The saw guide 15 adjustably carries the anvil 17 against which the teeth of the saw to be set are rested and the upper surface of the anvil is inclined as at 18, to give the desired inclination to the saw teeth. The forward portion of the saw guide 15 is provided with a slot 19 in which is slidably mounted the outwardly extending bolt 20 carried by or formed integral with the anvil 17. The outer end of the bolt 20 is threaded and has turned thereon a nut 21 which is adapted to engage against the outer face of the saw guide 15 for holding the anvil in correct position. To facilitate the raising and lowering of the anvil in the saw guide, so as to obtain the correct inclination of the teeth, an adjustable set screw 22 is carried by the lower end of the saw guide 15 and extends into the slot 19 and is adapted to engage the bolt 20. By turning the thumb or set screw, it can be seen that when the nut 21 is loosened, the anvil 17 can be readily raised or lowered. To hold the set or thumb screw 22 in position against accidental movement, a lock nut 23 is provided which is adapted to engage the outer face of the saw guide 15. To hold the saw in the guide 15, an upwardly and inwardly inclined set screw 24 is provided, which is mounted in the threaded bore of an enlargement 25 formed on the lower surface of the lower wall 6. This set or thumb screw 24 is adapted to be turned into engagement with the saw to be set. A suitable lock nut 26 is provided for engaging the outer face of the enlargement 25 so as to prevent accidental displacement of the set or thumb screw in relation to the enlargement.

The rear end of the lower wall 6 ends short of the rear edge of the side walls, and the rear end of the lower wall is provided with an inwardly extending lug 27 which is provided with an opening 28 which is in direct alinement with an opening 29 formed in the front wall 8. The alined openings 28 and 29 slidably support the plunger 30, which is provided with an inclined face 31 formed on its outer end which is adapted to engage the saw teeth to be set. A relatively weak spring 32 is coiled around the plunger and is adapted to hold the plunger in a rearward position out of engagement with the saw teeth.

To forcibly move the plunger 30 into engagement with the saw teeth, a spring actuated trigger 33 is provided, which has formed thereon a nose 34, which is adapted to engage the inner end of the plunger. The opposite end of the trigger 33 has a head 35 formed thereon which is rotatably mounted on a pin 36 which is carried by the side walls of the casing B. The nose 34 of the trigger 33 is normally urged into engagement with the plunger 30 by a relatively strong contractile coil spring 37, the terminals of which are provided with loops 38 and 39. The loop 39 is adapted to engage in outwardly extending pin 40 formed on the trigger intermediate the pin 36 and the nose 34 and this pin is formed with a less diameter than the loop 39 so as to permit a slight forward movement of the trigger in relation to the coil spring 37. The forward loop 38 formed on the coil spring receives an outwardly extending pin 41 formed on the head 42 of a bolt 43. The threaded portion of the bolt is fitted in the bore of a nut 44, which is rotatably carried by the front wall 8 of the casing. Thus it can be seen that by adjusting the nut 44, the tension of the coil spring 37 may be readily adjusted. The hammer 33 is adapted to be moved against the tension of the coil spring 37 to a cocked position by a trigger 45, which is adapted to engage a notch 46 formed on the hammer inwardly of the pivot point thereof. The inner end of the trigger 45 is pivoted as at 47 to a connecting link 48 which in turn is connected to an inwardly extending lug 49 formed on the rigid handle 11 intermediate its ends, by a pivot pin 50. The connecting link 48 is pivotally and slidably connected to the movable handle 12 by means of a pin 51 which is carried by the inwardly extending lugs 52 formed on the movable handle 12. The pin 21 is slidably mounted in a slot 53 formed in the link. To normally urge the trigger 45 in engagement with the hammer 43, a leaf spring 54 is provided which is secured by a suitable screw 55 at its rear end to the rigid handle 11. The outer face of the hammer 33 is curved as at 56, and when the hammer is swung on its pivot the curved face is adapted to gradually throw the trigger 45 out of engagement with the notch 46, so as to permit the hammer to be urged forcibly into engagement with the plunger 30.

In operation of the improved device, a saw to be set is placed in the V-shaped notches 16 formed in the guide 15 and the anvil 17 and the set screw 24 adjusted in relation thereto. The handles 11 and 12 are then grasped by the hands of the user and the handle 12 is forced inwardly toward the handle 11 which through the medium of the trigger 45 and connecting link 48 will swing the hammer 33 on the pivot pin 36 against the tension of the coil spring 37. When the hammer 33 has been swung beyond a predetermined point the trigger 45 will ride out of engagement with the notch 46 and thus permit the hammer to be thrown thrown forcibly into engagement with the plunger 30 which in turn will be forced into engagement with one of the saw teeth and hammer the same into correct position.

The saw is then moved along and the operation again repeated.

Changes in details may be made without departing from the spirit or scope of my invention; but,

I claim:

1. A saw set comprising a saw guide, a sliding plunger arranged to move into the saw guide, a spring pressed hammer for forcibly moving the plunger into the saw guide, a rigid handle, a movable handle, and means operated by the movable and rigid handles for operating the hammer.

2. A saw set comprising a casing, a saw guide carried by the casing, a sliding plunger carried by the casing and arranged to be moved into the saw guide, means for normally holding the plunger out of the saw guide, a rigid handle formed on the casing, a movable handle formed on the casing, and means operated by the handles for forcibly moving the plunger into the saw guide.

3. A saw set comprising a casing, a saw guide carried by the forward end of the casing and arranged to receive a saw, an anvil carried by the forward end of the guide, a plunger slidably mounted in the casing and arranged to extend into the guide for engaging the teeth of a saw, a relatively weak spring normally holding the plunger out of engagement with the saw teeth, a pivoted hammer arranged in the casing, a relatively strong spring arranged to normally urge the hammer into engagement with the plunger, a rigid handle, a movable handle, and means operated by the handles for moving the hammer against the tension of the coil spring and for releasing the same after the hammer reaches a predetermined position.

4. A saw set comprising a casing, a saw guide carried by the forward end of the casing, a sliding plunger carried by the casing and arranged to engage the teeth of a saw, a relatively weak spring arranged to normally hold the plunger out of engagement with the teeth of a saw, a hammer pivotally mounted in the casing, a relatively strong coil spring arranged in the casing for normally urging the hammer into engagement with the plunger, means for operating and releasing said hammer, and means for adjusting the tension of the relatively strong spring.

5. A saw set comprising a casing, a saw guide carried by the forward end of the casing arranged to receive a saw, an anvil carried by the guide, means for adjusting the anvil in relation to the guide, means for holding a saw in engagement with the anvil, a sliding plunger carried by the casing arranged to engage the saw teeth, a relatively weak spring for normally holding the plunger out of engagement with the saw teeth, a hammer pivotally mounted in the casing, a relatively heavy spring arranged to normally move the hammer in engagement with the plunger, and means for actuating the hammer.

6. A saw set comprising a casing, a saw guide carried by the casing arranged to receive a saw, an anvil carried by the guide, means for adjusting the anvil in relation to the guide, means for holding a saw in engagement with the anvil, a sliding plunger, a relatively weak spring arranged to normally hold the plunger out of engagement with the teeth of a saw, a hammer pivotally mounted in a casing, a relatively heavy coil spring arranged in the casing for normally urging the hammer in engagement with the plunger, a rigid handle formed on the casing, a movable handle pivotally carried by the casing, a trigger arranged to engage the hammer to move the same against the tension of the coil spring, means for normally holding the trigger in engagement with the hammer, and means for actuating the trigger by said handle.

7. A saw set comprising a casing, an annular saw guide carried by the forward end of the casing having inwardly extending V-shaped notches formed in its lower edge arranged to receive a saw, an anvil carried by the saw guide, means for holding a saw in engagement with the anvil, a sliding plunger carried by the casing, a pivoted hammer mounted in the casing, a relatively strong coil spring arranged to urge the hammer in engagement with the sliding plunger, the hammer having a notch formed therein, a trigger arranged to engage the notch, a rigid handle formed on the casing, a pivoted handle carried by the casing, a link pivotally carried by the rigid handle and pivotally and slidably carried by the movable handle, and means pivotally connecting the links to the outer end of the trigger.

RAYMOND L. WEBB.